United States Patent
Kim et al.

(10) Patent No.: US 9,347,420 B2
(45) Date of Patent: May 24, 2016

(54) BARRIER DISCHARGE DEVICE

(75) Inventors: Yoonho Kim, Ikeda (JP); Takeshi Serizawa, Ikeda (JP); Hiroaki Oi, Ikeda (JP); Akira Nakajima, Ikeda (JP)

(73) Assignee: Daihatsu Motor Co., Ltd., Osaka (JP)

( * ) Notice: Subject to any disclaimer, the term of this patent is extended or adjusted under 35 U.S.C. 154(b) by 259 days.

(21) Appl. No.: 13/813,595

(22) PCT Filed: Jul. 28, 2011

(86) PCT No.: PCT/JP2011/067245
§ 371 (c)(1),
(2), (4) Date: Feb. 11, 2013

(87) PCT Pub. No.: WO2012/017908
PCT Pub. Date: Feb. 9, 2012

(65) Prior Publication Data
US 2013/0160752 A1    Jun. 27, 2013

(30) Foreign Application Priority Data
Aug. 4, 2010  (JP) .................................. 2010-175169

(51) Int. Cl.
*F02P 13/00* (2006.01)
*F02P 15/08* (2006.01)
(Continued)

(52) U.S. Cl.
CPC ................ *F02P 15/08* (2013.01); *F02M 27/04* (2013.01); *F02P 13/00* (2013.01); *H01T 13/22* (2013.01); *H01T 13/52* (2013.01); *F02F 11/002* (2013.01); *F02P 3/01* (2013.01); *F16J 2015/0856* (2013.01)

(58) Field of Classification Search
CPC ............. F02D 13/0207; F02D 13/0219; F02B 2075/125; F02B 51/00; F02P 15/08; F02P 3/0838; F02P 3/0884; H01T 13/32; H01T 13/467; H01T 13/465; H01T 13/20; H01T 13/39; H01T 13/52; H01T 13/22; F16J 15/122; F16J 15/0825; F16J 2015/0856; F16J 15/0818; F02M 27/04
USPC .................. 123/636, 596, 169 EL, 163, 536; 313/139, 608; 277/592
See application file for complete search history.

(56) References Cited

U.S. PATENT DOCUMENTS

| | | | | |
|---|---|---|---|---|
| 5,444,331 A | * | 8/1995 | Matsuno | ............... H01J 65/046 313/553 |
| 6,053,503 A | * | 4/2000 | Buck | .................... F16J 15/0825 277/592 |

(Continued)

FOREIGN PATENT DOCUMENTS

| | | |
|---|---|---|
| CN | 101364708 | 2/2009 |
| GB | 2364098 | 1/2002 |

(Continued)

OTHER PUBLICATIONS

International Search Report for PCT/JP2011/067245, ISA/JP, mailed Oct. 11, 2011.

(Continued)

*Primary Examiner* — Thomas Moulis
*Assistant Examiner* — Joshua A Campbell
(74) *Attorney, Agent, or Firm* — Harness, Dickey & Pierce, P.L.C.

(57) ABSTRACT

An object of the present invention is to provide a barrier discharge device capable of increasing the combustion efficiency of an engine while overcoming the problems of the cumbersome replacement of the electrodes and the commercialization of the device. The barrier discharge device of an engine includes a dielectric body and at least two barrier discharge electrodes which are held inside the dielectric body and to which voltages for barrier discharge are applied, wherein each of the barrier discharge electrodes are not exposed to the inside of a cylinder bore and are arranged so as to surround the cylinder bore.

6 Claims, 2 Drawing Sheets

(51) Int. Cl.
  H01T 13/22  (2006.01)
  H01T 13/52  (2006.01)
  F02M 27/04  (2006.01)
  *F16J 15/08*   (2006.01)
  *F02F 11/00*   (2006.01)
  *F02P 3/01*    (2006.01)

(56) References Cited

U.S. PATENT DOCUMENTS

| | | | |
|---|---|---|---|
| 6,161,520 A | 12/2000 | Clarke | |
| 6,565,098 B2* | 5/2003 | Bleyh | F16J 15/0825 277/591 |
| 6,831,421 B1* | 12/2004 | Bletzinger | B01D 53/32 315/207 |
| 7,074,357 B2* | 7/2006 | Senda | H01G 9/10 264/259 |
| 7,392,795 B2* | 7/2008 | Nagamine | F02D 41/3041 123/143 B |
| 7,441,526 B1* | 10/2008 | Minami | F02P 15/02 123/143 B |
| 7,441,539 B1 | 10/2008 | Minami | |
| 7,441,540 B1 | 10/2008 | Minami | |
| 7,661,402 B2* | 2/2010 | Minami | F02P 5/00 123/143 B |
| 7,675,237 B2* | 3/2010 | Schiene | A61L 2/0011 313/234 |
| 7,708,282 B2* | 5/2010 | Veca | F16J 15/064 277/317 |
| 8,261,711 B2* | 9/2012 | Shimoda | H01T 13/52 123/169 E |
| 8,495,989 B2* | 7/2013 | Ikeda | F02B 23/08 123/536 |
| 8,602,005 B2* | 12/2013 | Ikeda | F02B 1/02 123/143 B |
| 9,022,006 B2* | 5/2015 | Segawa | F02M 29/00 123/299 |
| 2001/0035616 A1* | 11/2001 | Bleyh | F16J 15/0825 277/591 |
| 2005/0029748 A1* | 2/2005 | Matsumoto | F02B 77/085 277/592 |
| 2005/0110222 A1* | 5/2005 | Matsumoto | F02F 11/002 277/592 |
| 2007/0209634 A1* | 9/2007 | Minami | F02P 5/00 123/310 |
| 2011/0030660 A1 | 2/2011 | Ikeda | |
| 2012/0152198 A1* | 6/2012 | Kim | B62D 35/00 123/188.1 |
| 2013/0160752 A1* | 6/2013 | Kim | F02P 15/08 123/636 |
| 2015/0013650 A1* | 1/2015 | McAlister | F02M 57/06 123/538 |
| 2015/0037738 A1* | 2/2015 | McAlister | F02M 57/06 431/6 |

FOREIGN PATENT DOCUMENTS

| | | |
|---|---|---|
| JP | 2009-041367 | 2/2009 |
| WO | WO 2009-113692 | 9/2009 |
| WO | WO 2009113688 A1 * | 9/2009 |

OTHER PUBLICATIONS

German Office Action dated Mar. 5, 2015.
Chinese Office Action dated Dec. 18, 2014.

* cited by examiner

BARRIER DISCHARGE DEVICE

CROSS-REFERENCE TO RELATED APPLICATIONS

This application is a 371 U.S. National Stage of International Application No. PCT/JP2011/067245, filed Jul. 28, 2011, which claims priority to Japanese Patent Application No. 2010-175169, filed Aug. 4, 2010. The disclosures of the above applications are incorporated herein by reference.

TECHNICAL FIELD

The invention relates to a barrier discharge device for use in an engine, which includes a dielectric body and a barrier discharge electrode.

BACKGROUND ART

Conventionally, in the case of, for example, a spark ignition engine, a structure has been known in which multipoint ignition electrodes (hereinafter referred to as "peripheral electrodes") are embedded into a head gasket which is disposed between a cylinder head and a cylinder block in order to obtain larger flames than only using a single ignition gap (see, for example, Patent Document 1).

In such a structure, flames spread both concentrically and three-dimensionally in a combustion chamber from a central ignition plug arranged at the center of a ceiling of the combustion chamber and a plurality of peripheral electrodes. Accordingly, the time required for the flames to spread over the entire space of the combustion chamber is shortened, resulting in less time-loss and approaching a theoretical cycle, so that thermal efficiency can be improved. Thereby, quick combustion of an air-fuel mixture can be realized.

However, since the peripheral electrodes have a structure where the peripheral electrodes protrude toward the combustion chamber, it is difficult to secure endurance reliability. That is, since the electrodes of ignition plugs are generally consumed, the electrodes have to be replaced for each certain period. In the case of the multipoint peripheral electrodes, the plurality of peripheral electrodes are electrically connected in series with each other by a conductive member. Hence, even when only one of the peripheral electrodes is consumed, there are drawbacks that all of the peripheral electrodes have to be replaced for each head gasket.

Further, while the peripheral electrodes disclosed in Patent Document 1 are held by ceramics and are fired, the sintering of ceramics is difficult to be carried out. That is, it is difficult to sinter and fabricate the ceramics without hollows at a state where the metallic peripheral electrode is exposed, so that commercialization and mass production thereof cannot be easily achieved.

Further, there is also a problem that it is difficult to realize the commercialization because the electrodes are embedded into the head gasket.

CITATION LIST

Patent Document

Patent Document 1: JP-A-2007-270824

SUMMARY OF INVENTION

Technical Problem

Accordingly, the present invention has been made in view of the above problems, and an object of the present invention is to provide a barrier discharge device capable of increasing the combustion efficiency of an engine while overcoming the problems of the cumbersome replacement of the electrodes and the commercialization of the device.

Solution to Problem

The present invention employs the following configuration in order to solve the above-described problems. That is, a barrier discharge device of an engine of the present invention includes: a dielectric body; and at least two barrier discharge electrodes which are held inside the dielectric body and to which voltages for barrier discharge are applied; wherein the respective barrier discharge electrodes are not exposed to an inside of a cylinder bore and are arranged so as to surround the cylinder bore.

Here, the cylinder bore is a cylinder hole including a head gasket. Particularly, the cylinder bore is a portion that is exposed to the inside of a cylinder without being hidden by a piston, regardless of the position of the piston when the position performs reciprocating operation from a top dead center and a bottom dead center. The cylinder bore conceptually includes a combustion chamber.

According to this configuration, active species such as ozone are generated by barrier discharge and therefore it is possible to accelerate the combustion. Particularly, since the dielectric body and the barrier discharge electrodes are arranged so as to surround the cylinder bore, it is possible to generate surface ignition along the surface of the cylinder bore, and to thus accelerate the combustion by the surface ignition. Further, the respective barrier electrodes have improved durability compared to the conventional electrodes because the electrodes are not exposed to the inside of the cylinder bore.

As an embodiment in which mass production is easy and possibility is high, there is provided a case where the barrier discharge electrodes are embedded into the head gasket.

Further, in order to maintain generation of plasma even under high pressure hindering the generation of plasma, it is preferred that the barrier discharge electrodes include three or more electrodes and the barrier discharge electrodes to which voltages are applied can be changed according to an internal pressure of a cylinder.

Advantageous Effects of Invention

According to the present invention, a barrier discharge device is provided which is capable of increasing the combustion efficiency of an engine while overcoming the problems of the cumbersome replacement of the electrodes and the commercialization of the device.

MODE FOR CARRYING OUT THE INVENTION

An illustrative embodiment of the present invention will now be described with reference to the accompanying drawings.

Figure 1:
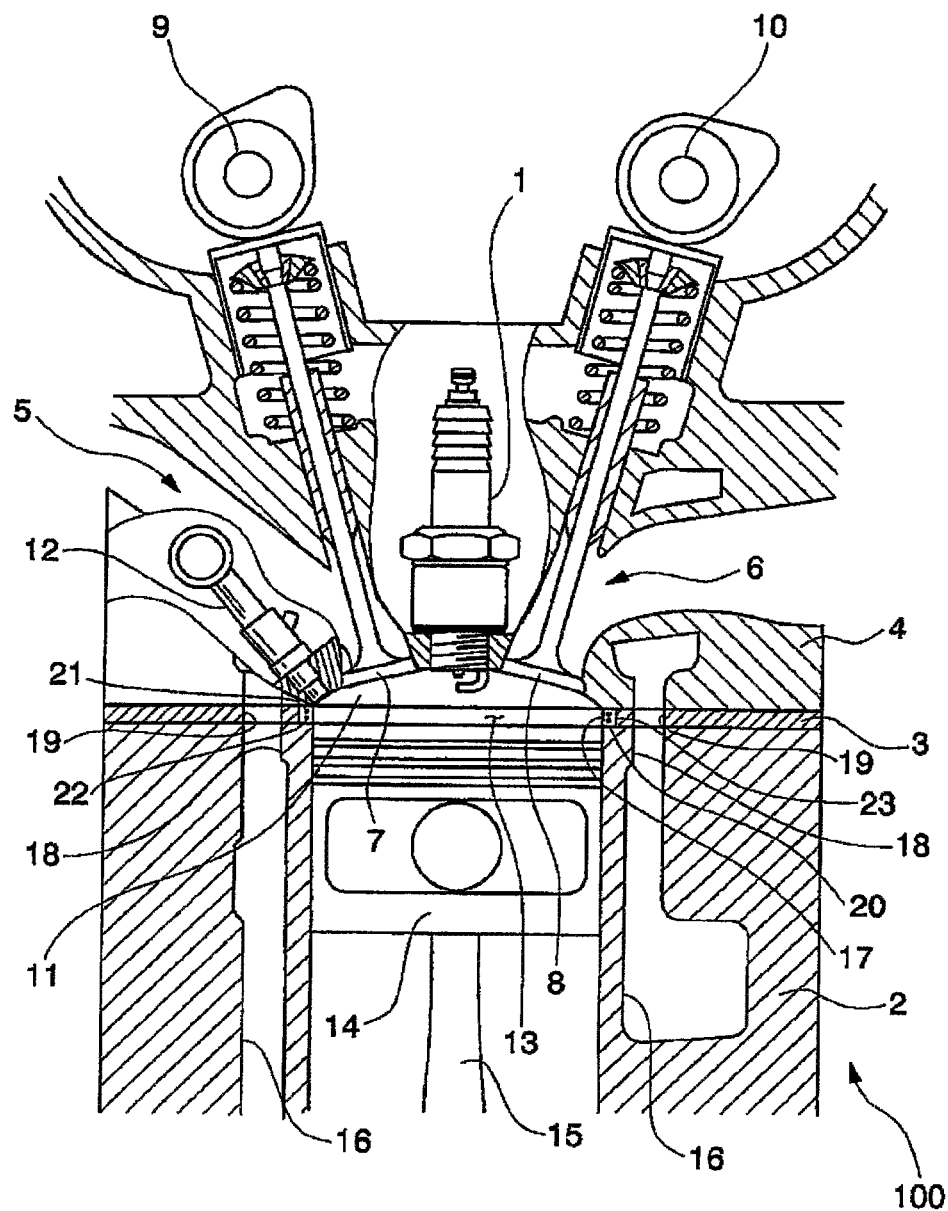
FIG. 1 is a sectional view illustrating a main part of an engine to which an illustrative embodiment of the present invention is applied.

FIG. 1 illustrates a configuration of one cylinder of a 2-cylinder engine 100 that is a spark ignition internal combustion engine having an ignition plug 1. The engine 100 includes a cylinder block 2 having a cylinder and a cylinder head 4 which is attached to the cylinder block 2 with a head gasket 3 interposed therebetween. The cylinder head 4 is provided with an intake port 5 and an exhaust port 6, such that the intake port 5 and the exhaust port 6 are opened and closed by an intake valve 7 and an exhaust valve 8, respectively. The intake valve 7 is driven by an intake cam shaft 9 which is rotatably attached to the cylinder head 4, and the exhaust valve 8 is similarly driven by an exhaust cam shaft 10. The cylinder head 4 is also provided with a combustion chamber 11, in which the ignition plug 1 is attached at the center of the ceiling thereof, and a fuel injection valve 12 which enables direct injection of fuel into the cylinder.

The cylinder head 4 is attached to the cylinder block 2 together with the head gasket 3 disposed on a lower surface of the cylinder head. The cylinder block 2 is formed with a cylinder bore 13. The cylinder bore 13 accommodates therein a piston 14 which reciprocates at the inside of the cylinder bore, and the piston 14 is connected to a crank shaft (not shown) via a connecting rod 15. In FIG. 1, a reference numeral 16 denotes a water jacket in which cooling water circulates. In the meantime, the engine 100 may employ a spark ignition type engine which is known in the art and does not include the head gasket 3.

The head gasket 3 is made of dielectric ceramic and has a plane shape that substantially corresponds to a shape of an upper surface of the cylinder block 2. Specifically, the head gasket 3 basically includes a bore opening 17 which is provided in correspondence to an inner diameter of each cylinder bore 13 and a jacket opening 19 which corresponds to an opening 18 of the water jacket 16 provided on the upper surface of the cylinder block 2. Other parts of the head gasket adhere tightly to the cylinder block 2 and the cylinder head 4 to exhibit sealability. The bore opening 17 functions as a part of the combustion chamber 11 when the head gasket 3 is disposed between the cylinder head 4 and the cylinder block 2. Near the bore opening 17, barrier discharge electrodes 21 and 22 configuring a barrier discharge device 20 are provided so as to surround the bore opening 17. In this illustrative embodiment, a part of the head gasket 3 serves as a dielectric body 23 of the barrier discharge device 20.

The barrier discharge electrodes 21 and 22 are made of metal such as tungsten or the like, and include a ring-type first electrode 21 and a second electrode 22 having the same size and shape as those of the first electrode 21. That is, the first and second electrodes 21 and 22 respectively have the size and the shape by which the electrodes can be attached along a circumference of the bore opening 17 of the head gasket 3 corresponding to the cylinder bore 13. The first and second electrodes 21 and 22 are respectively arranged parallel along the cylinder bore 13 and are embedded into the head gasket 3.

Figure 2:
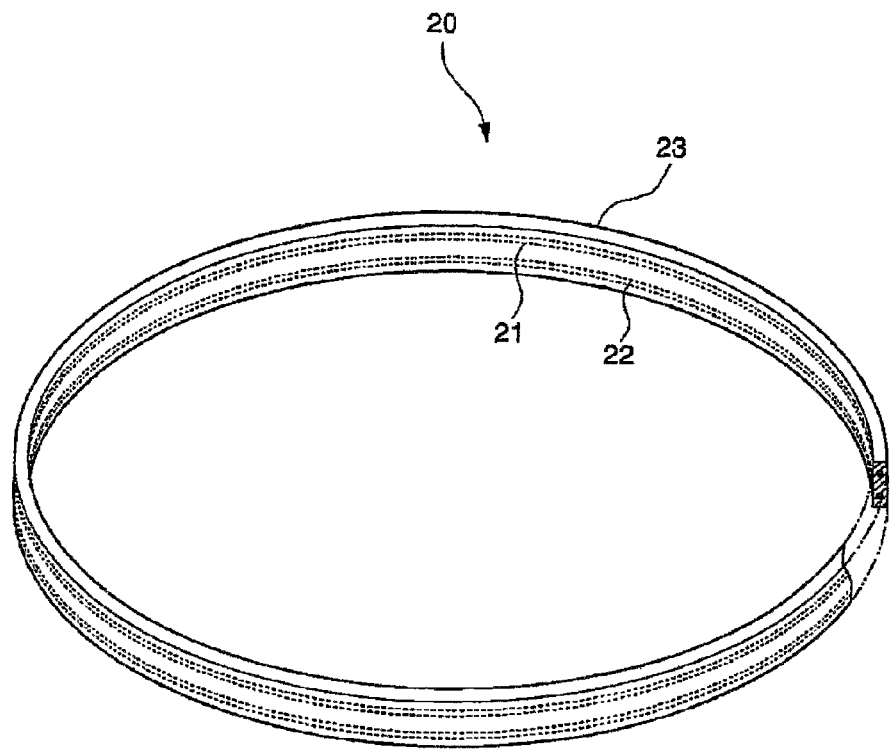
FIG. 2 enlarged perspective view pictorially illustrating a barrier discharge device of the illustrative embodiment, in which the barrier discharge device is partially shown in a breakaway view.

That is, as schematically shown in FIG. 2, the engine 100 in this illustrative embodiment includes the barrier discharge device 20 which includes the ring-type dielectric body 23 integrally attached to the head gasket 3 and the barrier discharge electrodes 21 and 22 held inside the dielectric body 23. In other words, the barrier discharge device 20 includes a part of the head gasket 3 serving as the ring-type dielectric body 23 and two barrier discharge electrodes held inside the dielectric body 23, i.e. the first and second electrodes 21 and 22. The first and second electrodes 21 and 22 are arranged so as to surround the cylinder bore 13 without being exposed to the inside of the cylinder bore 13.

Low temperature plasma is generated in the cylinder bore 13 at an inner side the first and second electrodes 21 and 22 by a barrier discharge by applying a high voltage to the first and second electrodes 21 and 22 using an alternating current generator (not shown). The alternating current generator is configured to boost the voltage of, for example, a vehicle battery, which is, for example, 12 V (volt), to 300 V to 500 V by using a DC-DC converter as a boosting circuit, convert the boosted direct current to an alternating current having a frequency of about 100 Hz to 10 kHz using an H bridge circuit, and additionally, output an alternating current boosted to about 5 kVp-p to 20 kVp-p using a transformer (not shown).

In this illustrative embodiment, the alternating current that is outputted from the alternating current generator is applied to the first and second electrodes 21 and 22 to generate barrier discharge between the first and second electrodes 21 and 22. With such barrier discharge, plasma is generated in a space of the cylinder bore 13 which is surrounded by the first and second electrodes 21 and 22, and an air-fuel mixture is ignited.

That is, since the plasma generated in the cylinder bore 13 is generated along the first and second electrodes 21 and 22, the plasma continuously exists in a ring type like the electrodes 21 and 22. The generation of the plasma has the effect on a compressed air-fuel mixture during, for example, a compression stroke of the engine 100, resulting in generating active species such as electrons, ions, radicals, ozone, etc. Although the generated plasma is so-called low temperature plasma, because the electrons have high temperature, the air-fuel mixture can be ignited together with the temperature of the air-fuel mixture being increased by compression. In this case, flames in the cylinder bore 13 spreads from the portion near the first and second electrodes 21 and 22 at which the plasma is generated towards the inside of the cylinder bore. Since there are the active species which are generated by the ring-type plasma and radicals or the like which are increased by chain reaction in the cylinder bore 13, the combustion spreads towards the center of the cylinder bore 13.

In the meantime, when the barrier discharge device 20 is operated during an intake stroke, it is possible to increase the active species or radicals, which are generated by plasma, in the air-fuel mixture which is introduced into the cylinder bore 13. Accordingly, when the piston reaches the top dead center in the compression stroke as described before, the air-fuel mixture is ignited as the temperature of the air-fuel mixture rises by compression.

As described above, the barrier discharge device 20 according to this illustrative embodiment includes the ring-type dielectric body 23 and the barrier discharge electrodes 21 and 22 which are held inside the dielectric body 23 and to which voltages for barrier discharge are applied and is mounted to the engine 100. Here, since the respective barrier discharge electrodes 21 and 22 are arranged so as to surround the cylinder bore 13 without being exposed to the inside of the cylinder bore 13, the barrier discharge enables the active species such as ozone or the like to be generated, thereby accelerating the combustion. Especially, since the ring-type dielectric body 23 and the barrier discharge electrodes 21 and 22 are arranged so as to surround the cylinder bore 13, surface ignition of the air-fuel mixture can be obtained along the inner surface of the cylinder bore 13. Such surface ignition can accelerate the combustion compared to a normal point-ignition using only an ignition plug.

The barrier discharge device 20 of this illustrative embodiment is provided in the head gasket 3 and the barrier discharge electrodes 21 and 22 are embedded into the head gasket 3, making it easier to perform mass-production thereof. Further, since the barrier discharge electrodes 21 and 22 are not exposed to the inside of the cylinder bore 13, durability is improved compared to the conventional art.

Further, the barrier discharge electrodes 21 and 22 are made of tungsten, providing an advantage in that the electrodes can be easily fabricated by printing.

Further, the first and second electrodes are respectively arranged in parallel, making it possible to generate plasma homogeneously.

Further, the plasma is generated at an end gas section in the cylinder bore 13, so that the air-fuel mixture at the end gas section in which non-combusted gas is apt to accumulate is ignited, thereby preventing knocking from occurring. Thereby, a compression ratio can be easily improved.

A direct current generator may be used instead of the alternating current generator. However, since a state where electrons are emitted only from a cathode is continued in the direct current generator, use of the alternating current generator can restrict an electrode from being consumed.

Further, instead of the alternating current voltage generator, a pulsating current generator may be used. That is, with application of a pulsating voltage such as a pulse-type voltage rather than application of an alternating current between a pair of electrodes, an electric field is generated between the pair of electrodes. Like the alternative current voltage generator, the pulsating current generator is configured to boost a direct current supplied from a battery using a DC-DC converter, convert a high voltage direction current to a pulsating current by periodic interruption of the high voltage direction current, boost the pulsating current using a boosting transformer and apply the boosted pulsating current to the pair of electrodes. In the pulsating current generator, a switching circuit which periodically turns on and off is used rather than the H bridge circuit. With the use of the pulsating current generator, an electric field can be generated between the pair of electrodes, having the same effects as in the above illustrative embodiment.

In the meantime, the present invention is not limited to the above-mentioned illustrative embodiment.

In the barrier discharge device, three or four or more electrodes instead of the above-described two electrodes may be held inside the respective dielectric body.

Figure 3:
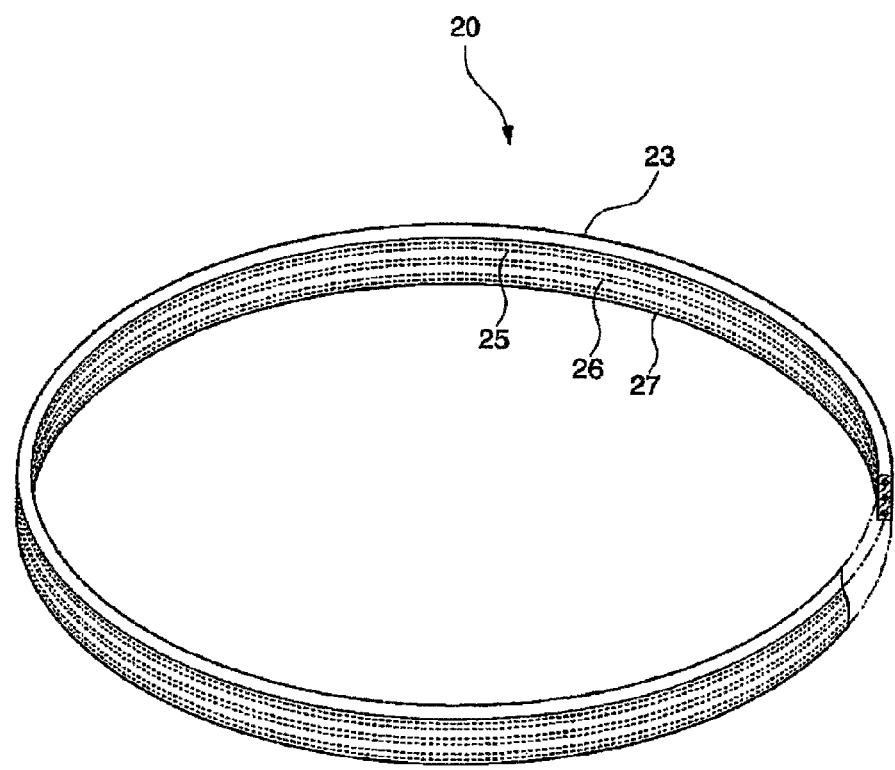
FIG. 3 is a view corresponding to FIG. 2, illustrating a barrier discharge device according to another embodiment of the present invention.

A barrier discharge device 20 schematically illustrated in FIG. 3 includes a head gasket 3 which configures a ring-type dielectric body 23 integrally attached to the head gasket 3 and three barrier discharge electrodes 25, 26, and 27 which are held inside the dielectric body 23. These respective barrier discharge electrodes, i.e., the first, second, and third electrodes 25, 26, and 27, are not exposed to the inside of the cylinder bore 13 and are arranged so as to surround the cylinder bore 13. Further, the first to third electrodes 25, 26, and 27 respectively are of a ring-shape, and are arranged in order in parallel along the cylinder bore 13 from the cylinder head 4 toward the cylinder block 2. These first to third electrodes 25, 26, and 27 are embedded into the dielectric body 23. In the meantime, in the illustrative embodiment shown in FIG. 3, elements corresponding to those elements of the above-described illustrative embodiment are denoted by the same reference numerals, and a detailed description thereof will be omitted.

With the configuration in which the barrier discharge electrodes 23 includes three or more electrodes, and the barrier discharge electrodes to which voltages are applied may be changed according to an internal pressure of a cylinder which is detected by a means for detecting the internal pressure of the cylinder, which is not shown, the barrier discharge can be optimized according to the driving state or the state of the combustion chamber 11.

Specifically, when the internal pressure of the cylinder is high, plasma is generated between the first and second electrodes 25 and 26 by applying a high pressure voltage to the first and second electrodes 25 and 26 using the AC generator. On the contrary, when the internal pressure of the cylinder is low, plasma is generated between the first and third electrodes 25 and 27 by applying a high pressure voltage to the first and third electrodes 25 and 27 using the AC generator. That is, when the internal pressure of the cylinder is high, there is caused a state where it is difficult to generate plasma in the combustion chamber 11. In this case, however, the plasma can be intensively generated within a short distance by making an inter-electrode distance as short as possible. On the other hand, when the internal pressure is low, there is caused a state where it is easier to generate plasma in the combustion chamber 11 than at high pressure. Thus, in this case, the plasma can be generated over a wide range by making an inter-electrode distance as long as possible. Further, an internal pressure which is measured by a cylinder internal pressure sensor (not shown) which is provided e.g. in the combustion chamber 11 or ion current values measured in the combustion chamber 11 may be used as the means for detecting the internal pressure of the cylinder.

When controlling the intensity of plasma that is generated according to the internal pressure of the cylinder, a voltage and a frequency may be changed within the same range as in the description provided with respect to the AC generator according to the above-described embodiment. For example, in order to increase the intensity of plasma, the voltage and frequency are increased. Thus, while such measures are disadvantageous from the standpoint of energy consumption, since the plasma can be made greater, the combustion state can be improved.

Although the surface ignition by the plasma has been described in the above-described embodiment, the ignition plug may be operated at substantially the same time as the surface ignition so that the point-ignition by the ignition plug may be additionally combined with the surface ignition. In this case, since the active species, radicals or the like are contained in the air-fuel mixture by the action of the plasma, the spreading of the combustion is quicker than in the multi-point ignition manner of the conventional art, thereby improving combustion characteristics.

Although the barrier discharge device having the ring-type dielectric body and the barrier discharge electrodes has been described in the above-described embodiment, the barrier discharge device may also be configured by a substantially semi-circular dielectric body and barrier discharge electrodes and may be arranged at a position to surround the cylinder bore. In this case, when the dielectric bodies are separated from each other and the dielectric body is integrally attached to, for example, the head gasket, it is possible to individually remove the dielectric bodies, thereby facilitating maintenance. Similarly, the dielectric body may also be a circular body that is divided into substantially 4 or 8 portions.

Although the barrier discharge device which is provided in the gasket interposed between the cylinder head and the cylinder block has been described in the above-described embodiment, the installation place for the barrier discharge device is not limited thereto. That is, the barrier discharge device may be provided in the combustion chamber or to the cylinder block in the cylinder bore, so long as the place does not interfere with up and down motions of the piston. For example, when the barrier discharge device is provided in the combustion chamber, a ring-type dielectric body is preferably arranged so as to surround the ignition plug.

A pulsating current generator or a pulse voltage generator may be used as the power source for the barrier discharge device other than the alternating current generator. A waveform of a pulsating voltage outputted from the pulsating current generator may include, but is not limited to, half-wave or full-wave rectified waveforms of alternating current, a square waveform, or the like.

Further, copper may be used other than tungsten for the barrier discharge electrode.

Although the plurality of electrodes need not be arranged in parallel, when the electrodes are arranged parallel, homogeneous plasma may be generated, resulting in homogeneous combustion in the combustion chamber.

While the above description has been made with respect to a spark ignition-type engine having an ignition plug, the engine is not limited to the engine having the ignition plug. The engine may also be, for example, a diesel engine.

Various modifications may be made without departing from the scope of the present invention.

Although the present invention has been described in detail and with reference to specific embodiments, it will be apparent to those skilled in the art that various changes and modifications may be made without departing from the spirit and scope of the invention.

The application is based on Japanese Patent Application (Japanese Patent Application No. 2010-175169) filed on Aug. 4, 2010, the entire contents of which are incorporated herein by reference.

REFERENCE NUMERALS LIST

100 Engine
3 Head Gasket
21, 22, 25, 26, 27 Barrier Discharge Electrode
23 Dielectric Body

The invention claimed is:

1. A barrier discharge device of an engine, comprising:
   a dielectric body; and
   at least two axially aligned and spaced apart annular barrier discharge electrodes which are held inside the dielectric body and to which voltages for barrier discharge are applied;
   wherein the respective barrier discharge electrodes are not exposed to an inside of a cylinder bore and are arranged so as to surround the cylinder bore;
   wherein the at least two barrier discharge electrodes are formed of the same material.

2. The barrier discharge device according to claim 1, wherein the barrier discharge electrodes are embedded into a head gasket.

3. The barrier discharge device according to claim 1, wherein the barrier discharge electrodes include three or more axially aligned and spaced apart annular barrier discharge electrodes and the barrier discharge electrodes to which voltages are applied can be changed according to an internal pressure within the cylinder.

4. A barrier discharge device of an engine, comprising:
   a dielectric body; and
   at least two barrier discharge electrodes which are held inside the dielectric body and to which voltages for barrier discharge are applied;
   wherein the respective barrier discharge electrodes are not exposed to an inside of a cylinder bore and are arranged so as to surround the cylinder bore, and
   wherein the barrier discharge electrodes include three or more electrodes and the barrier discharge electrodes to which voltages are applied can be changed according to an internal pressure within the cylinder;
   wherein the at least two barrier discharge electrodes are formed of the same material.

5. The barrier discharge device according to claim 4, wherein the barrier discharge electrodes are embedded into a head gasket.

6. A barrier discharge device of an engine, comprising:
   a dielectric body; and
   at least two barrier discharge electrodes which are held inside the dielectric body and to which voltages for barrier discharge are applied;
   wherein the respective barrier discharge electrodes are not exposed to an inside of a cylinder bore and are arranged so as to surround the cylinder bore, and
   wherein the barrier discharge electrodes extend in a circumferential direction along the cylinder bore and are embedded into a head gasket in a state of being spaced from each other in an upper-lower direction so as to be parallel to each other;
   wherein the at least two barrier discharge electrodes are formed of the same material.

* * * * *